(12) United States Patent
Martin et al.

(10) Patent No.: US 9,244,690 B2
(45) Date of Patent: Jan. 26, 2016

(54) VARIABLE FREQUENCY OUTPUT TO ONE OR MORE BUFFERS

(75) Inventors: Todd Martin, Orlando, FL (US); Vineet Goel, Winter Park, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 511 days.

(21) Appl. No.: 12/878,667

(22) Filed: Sep. 9, 2010

(65) Prior Publication Data

US 2011/0057938 A1 Mar. 10, 2011

Related U.S. Application Data

(60) Provisional application No. 61/240,859, filed on Sep. 9, 2009.

(51) Int. Cl.
*G06F 9/38* (2006.01)
*G06F 15/17* (2006.01)
*G06T 1/00* (2006.01)

(52) U.S. Cl.
CPC .............. *G06F 9/3851* (2013.01); *G06F 15/17* (2013.01); *G06T 1/00* (2013.01)

(58) Field of Classification Search
None
See application file for complete search history.

(56) References Cited

U.S. PATENT DOCUMENTS

| | | | |
|---|---|---|---|
| 7,254,283 B1 * | 8/2007 | Nishigaki et al. | 382/304 |
| 7,376,768 B1 * | 5/2008 | Macciocca | 710/56 |
| 7,739,473 B1 * | 6/2010 | Nordquist | 711/170 |
| 7,755,631 B1 * | 7/2010 | Mrazek et al. | 345/501 |
| 8,085,272 B1 * | 12/2011 | Molnar et al. | 345/505 |
| 8,139,069 B1 * | 3/2012 | Molnar et al. | 345/505 |
| 8,243,086 B1 * | 8/2012 | Diard | 345/555 |
| 8,295,621 B1 * | 10/2012 | Diard | 382/233 |
| 2005/0039182 A1 * | 2/2005 | Hooper et al. | 718/100 |
| 2005/0253858 A1 * | 11/2005 | Ohkami et al. | 345/531 |
| 2006/0002295 A1 * | 1/2006 | Hurtgen et al. | 370/229 |
| 2006/0047461 A1 * | 3/2006 | Sivaram et al. | 702/120 |
| 2006/0055695 A1 * | 3/2006 | Abdalla et al. | 345/426 |
| 2007/0204058 A1 * | 8/2007 | Ladd et al. | 709/231 |
| 2008/0143730 A1 * | 6/2008 | Lindholm et al. | 345/501 |
| 2008/0151765 A1 * | 6/2008 | Cheruvathery | 370/252 |
| 2008/0266296 A1 * | 10/2008 | Ramey et al. | 345/440 |
| 2008/0270744 A1 * | 10/2008 | Hashimoto | 711/217 |
| 2009/0031175 A1 * | 1/2009 | Aggarwal et al. | 714/47 |
| 2011/0050713 A1 * | 3/2011 | McCrary et al. | 345/522 |

OTHER PUBLICATIONS

Lindholm, Erik; Nickolls, John; Oberman, Stuart; Montrym, John, NVIDIA Tesla: A Unified Graphics and Computing Architecture, Mar.-Apr. 2008, IEEE, vol. 28 Issue: 2, pp. 39-55.*

* cited by examiner

*Primary Examiner* — Maurice L McDowell, Jr.
(74) *Attorney, Agent, or Firm* — Volpe and Koenig, P.C.

(57) ABSTRACT

A system and method are presented by which data on a graphics processing unit (GPU) can be output to one or more buffers with independent output frequencies. In one embodiment, a GPU includes a shader processor configured to respectively emit a plurality of data sets into a plurality of streams in parallel. Each data is emitted into at least a portion of its respective stream. Also included is a first number of counters configured to respectively track the emitted data sets.

23 Claims, 5 Drawing Sheets

VARIABLE FREQUENCY OUTPUT TO ONE OR MORE BUFFERS

CROSS-REFERENCE TO RELATED APPLICATIONS

This application claims the benefit of U.S. Provisional Application No. 61/240,859, entitled, "Variable Frequency Output to One or More Buffers", filed Sep. 9, 2009, which is incorporated herein by reference in its entirety.

BACKGROUND OF THE INVENTION

1. Field of the Invention

The present invention relates to a processor with variable frequency output.

2. Background Art

Processors, such as graphics processing units (GPUs), can provide fast solutions for a variety of complex algorithms due to their highly parallel structure. However, although multiple threads (or programs) can run in parallel on a conventional GPU, their output data can only be grouped into a single output stream. This limits the performance of the processor when multiple threads line up to output data into the single output stream.

What is needed, therefore, is a technique for enabling output data from multiple threads to be grouped into multiple output streams.

SUMMARY

Embodiments of the present invention relate to processors (including, but not limited to, GPUs). In particular, embodiments of the present invention relate to systems and methods for outputting data with a variable frequency on a processor (e.g., GPU). In one embodiment, a GPU includes a shader processor and a number of counters. The shader processor can process data for one or more threads in parallel. For each thread, one or more streams are assigned to the processed data corresponding to the thread. The shader processor emits the data into the assigned streams. Each stream is associated with a counter tracking the emitted data for the stream.

In another embodiment, a method for outputting data using one or more streams on a processor is introduced. The processor can process data for one or more threads in parallel. In order to output the processed data, one or more streams are enabled. A shader processor on, for example, a GPU emits the data into the enabled streams. For each thread, the corresponding data is emitted into a subset of the enabled streams. A number of counters are associated with the enabled streams respectively. The amount of emitted data in each enabled stream is tracked in the associated counter. The enabled streams are then stored in one or more stream buffers for output.

By allowing output data corresponding to different threads in parallel, the data read-write throughput of the processor can be increased.

Further features and advantages of the invention, as well as the structure and operation of various embodiments of the invention, are described in detail below with reference to the accompanying drawings.

BRIEF DESCRIPTION OF THE DRAWINGS/FIGURES

Embodiments of the invention are described with reference to the accompanying drawings. In the drawings, like reference numbers can indicate identical or functionally similar elements. The drawing in which an element first appears is generally indicated by the left-most digit in the corresponding reference number.

DETAILED DESCRIPTION OF EMBODIMENTS OF THE INVENTION

In the detailed description of the invention herein, references to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the present invention relate to a system and method for outputting data on a GPU to one or more buffers with independent output frequencies. In one embodiment, multiple sets of data can be processed by the GPU in parallel with each set of data corresponding to a respective thread as it runs on the GPU. In one embodiment, a thread can be a program that can run on the GPU, such as vector or scalar processing. Although the embodiments illustrated and described relate to GPUs, other processors (such as CPUs, vector processors and others) may benefit from aspects of the invention. Additionally, while embodiments describing aspects of the invention suggest an embodiment with a discrete GPU, a GPU or other processor may be included as part of another device or package. For example, embodiments a GPU may form part of a northbridge device or be included in a CPU or in the same package as the CPU). Other embodiments are also possible.

The multiple sets of data can be emitted into streams simultaneously. Each set of data can be emitted into one or more streams, and each stream is output to a stream buffer. This allows the threads to run in parallel on the GPU and only serializes the data output afterwards. Such parallelization enables the GPU to run faster and makes it more suitable for general purpose applications.

According to one feature of the present invention, the workload of the GPU with multiple streams is easily parallelizable without requiring complicated programming. This keeps significant amounts of hardware busy and efficiently improves throughput.

Figure 1:
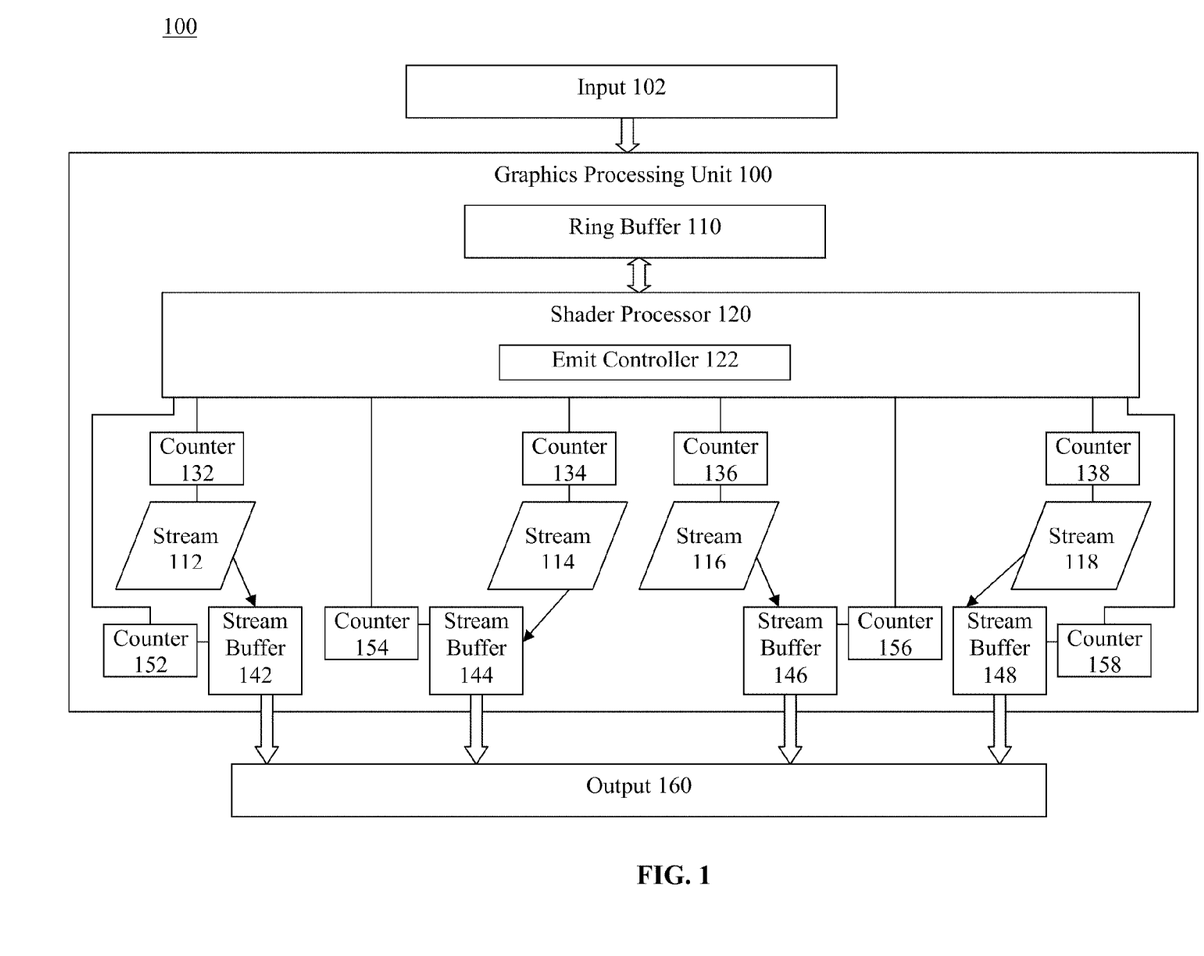
FIG. 1 is an exemplary system diagram of a GPU with variable frequency output to one or more buffers, according to one embodiment of the invention.

FIG. 1 is a block diagram illustration of an exemplary system diagram of a GPU 100 with variable frequency output, according to one embodiment of the invention.

In the illustration of FIG. 1, GPU 100 includes a ring buffer 110, a shader processor 120, a first set of counters 132, 134, 136, and 138, a set of stream buffers 142, 144, 146, and 148, and a second set of counters 152, 154, 156, and 158. Ring buffer 110 can be a memory device that has sections to store data for threads running on GPU 100. In one embodiment, ring buffer 110 is an on-chip memory of GPU 100. In another embodiment, ring buffer 100 can be an off-chip memory of GPU 100. The location of ring buffer 110 depends upon specific applications.

Shader processor 120 can process data input and output for one or more threads. Shader processor 120 emits data into streams and stores the streamed data to stream buffers. The streams can be streams 112, 114, 116, and 118. The stream buffers can be stream buffer 142, 144, 146, and 148. Note that in alternative embodiments, GPU 100 can have different numbers of streams and/or stream buffers. In one embodiment, only a selected number of streams are enabled. Shader processor then emits data into the enabled streams.

Figure 2:
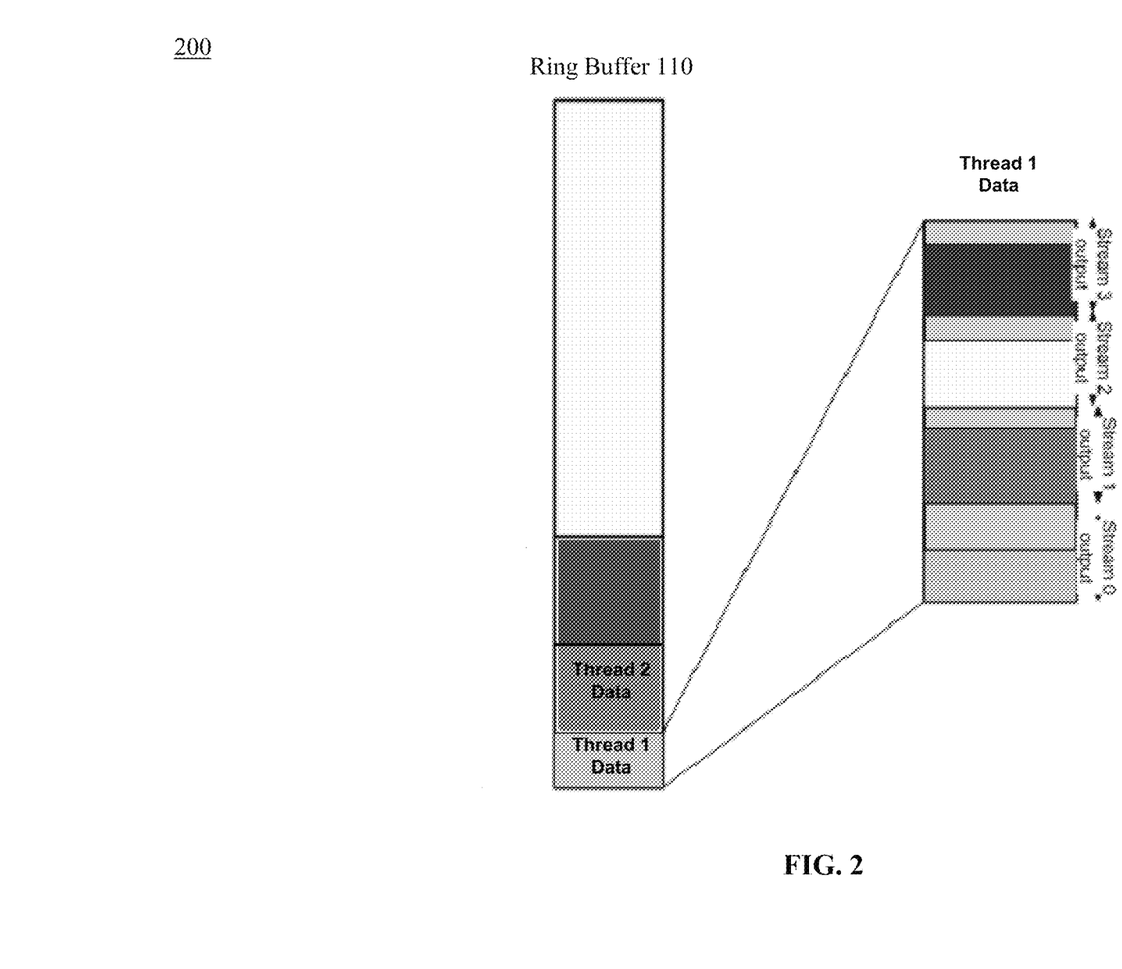
FIG. 2 is an exemplary diagram illustrating how the data in a ring buffer is emitted to streams on a GPU in accordance with the present invention.

In an embodiment, shader processor 120 first writes data to ring buffer 110 before emitting the data into streams. FIG. 2 is an illustration of an exemplary diagram illustrating how to emit data in ring buffer 110 into streams on a GPU, such as GPU 100. The ring buffer 110 is divided into sections. Each thread running in shader processor 120 is assigned its own section in ring buffer 110. For a thread, writes to the output memory device, e.g. ring buffer 110, can run in parallel without ordering conflicts. Accordingly, the data corresponding to each thread can be written to the assigned section in the ring buffer in parallel. As shown in FIG. 2, ring buffer 110 stores data for thread 1 and thread 2 in different sections.

By way of example, thread 1 data and thread 2 data can be written to ring buffer 110 in parallel. Shader processor 120 can then retrieve the data in ring buffer 110 section by section. Each thread can be assigned a number of streams. The data corresponding to each thread can then be emitted into the assigned streams. For example, thread 1 data is emitted into four streams: streams 0-3, as shown in FIG. 2. Streams 0, 1, 2, and 3 correspond to streams 112, 114, 116, and 118 of GPU 100, respectively.

In one embodiment, a thread can declare the number of the streams to store its corresponding data. In another embodiment, the number of the streams for a thread can be decided by GPU 100. Each stream can have a different amount of emitted data compared to the other streams.

In an alternative embodiment, GPU 100 can associate an individual ring buffer with each stream rather than interleave data for multiple streams in a single ring buffer.

GPU 100 can also include an emit controller 122 for tracking emitted data. In the embodiment of FIG. 1, emit controller 122 is included in shader processor 120. Emit controller 122 can associate a respective counter to each stream and track the data emitted to the stream using the associated counter. For example, counter 132 can be associated with stream 112, counter 134 can be associated with stream 114, counter 136 can be associated with stream 116, and counter 138 can be associated with stream 118. Emit controller 122 can use counters 132, 134, 136, and 138 to record the amount of the data emitted into the corresponding streams respectively.

Each counter and each stream can be identified by a thread ID. When there is a single stream, as in a conventional system, the thread ID is always incremented by one before being assigned to the next thread. In one embodiment, a thread ID is assigned per stream rather than per thread. So if there are 4 streams, the counters and streams for the first thread are assigned thread IDs 0-3. The counters and streams for the next thread are assigned thread IDs 4-7, and so on. Different threads can be assigned same counters and streams with different assigned thread IDs.

In some embodiments, streams don't have to be enabled sequentially. For example, streams 112, 116, 118 can be enabled while stream 114 is disabled. In this case, thread ID's 0-2 can be assigned to the first thread, 3-5 to the second thread, and so on. Therefore, the streams are packed to maximize the use of the counters. The configuration indicating the enabled streams can be stored in a table stored in on-chip registers or in an off-chip memory. After the thread finishes, the stored configuration information can be used to determine which stream is associated with a particular thread ID.

Shader processor 120 can store the data from streams 112, 114, 116, and 118 in stream buffers 142, 144, 146, and 148. In one embodiment, data from each stream is stored in a different stream buffer. The second set of counters 152, 154, 156, and 158 can be used to track the streams stored in the stream buffers. In one embodiment, emit controller 122 can associate a respective counter to each stream buffer and record the amount of data stored in the stream buffer in the corresponding counter. For example, counter 152 can be associated with stream buffer 142, counter 154 can be associated with stream buffer 144, counter 156 can be associated with stream buffer 146, and counter 158 can be associated with stream buffer 148. Counters 152, 154, 156, and 158 can be the same type as counters 132, 134, 136, and 138. In one embodiment, the counters are stored in on-chip registers of GPU 100. In an alternative embodiment, the counters are stored in off-chip memory.

Data for one or more threads can be sent to GPU 100 via input 102 and processed in shader processor 120. Shader processor 120 can store the processed data in Ring buffer 110 before emitting the data into streams. Shader processor then retrieves the data from ring buffer 110 and sends it to output 160 via streams and stream buffers. In one embodiment, there can be multiple threads running in shader processor 120 in parallel. Accordingly, multiple sets of data corresponding to these threads can also be processed in parallel.

Figure 3:
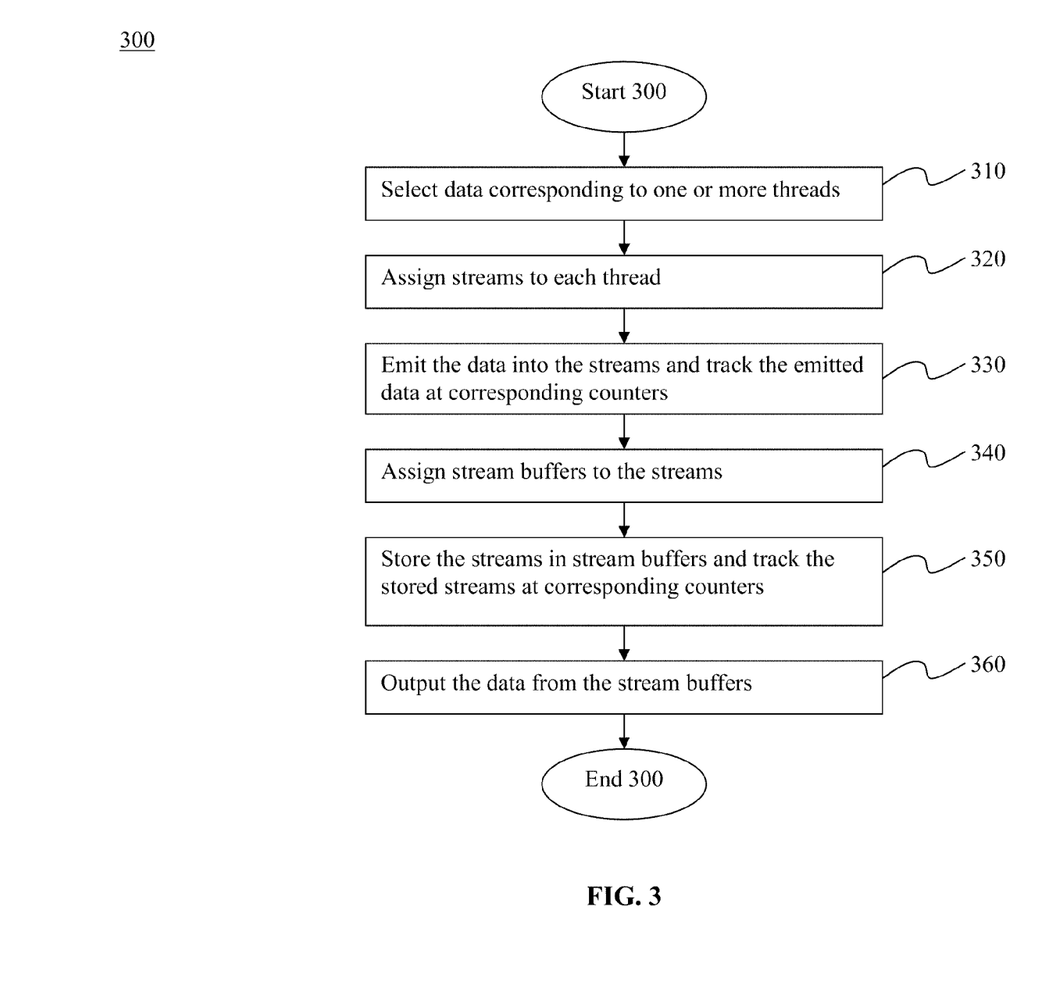
FIG. 3 is a flow chart of an exemplary process for outputting data to stream buffers via one or more streams in accordance with the present invention.

FIG. 3 is a flow chart of an exemplary process 300 for outputting data to stream buffers via multiple streams, according to one embodiment of the invention. In step 310, shader processor 120 can select processed data corresponding to one or more of those threads for output. Once the processing of a set of data is finished, shader processor 120 can first send it to a temporary memory device, such as ring buffer 110. Shader processor 120 then selects processed data from ring buffer 110 for output.

In step 320, shader processor 120 assigns streams to the threads. In one embodiment, shader processor 120 assigns the streams based on the number of streams declared in each thread. Shader processor 120 also associates a respective counter for each assigned stream. In an alternative embodiment, emit controller 122 associates the counters to the streams. One or more streams can be assigned to a single thread. It is possible that not all available streams are used by shader processor 120. Before assigning the streams to the threads, shader processor 120 can enable a subset of the available streams and only assigns the enabled streams to the threads depending on particular applications. Each assigned stream has a thread ID which is determined based on the corresponding thread.

Figure 4:
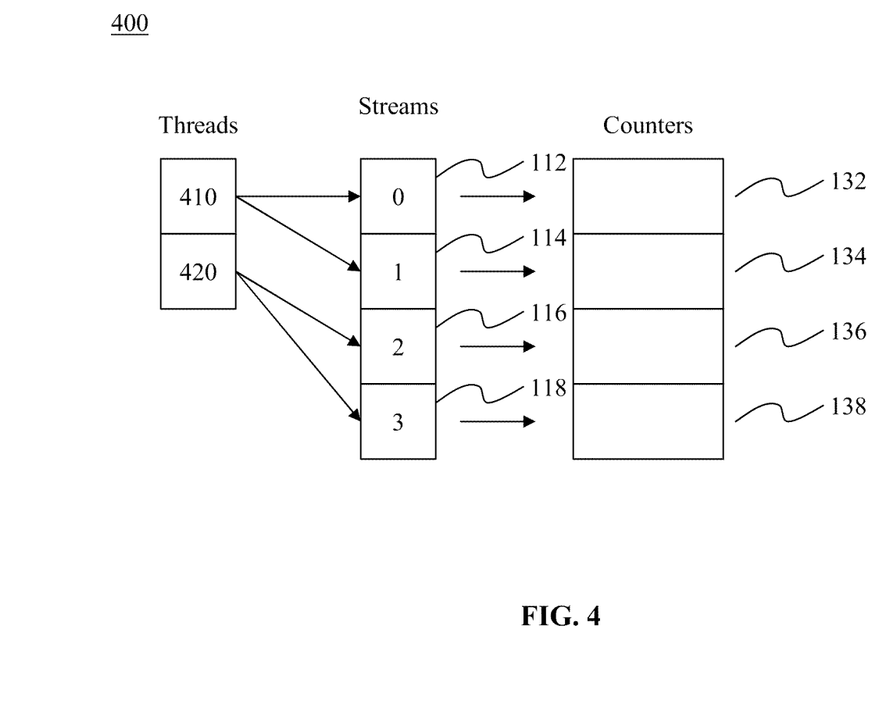
FIG. 4 is an exemplary diagram illustrating relations among threads, streams, and counters in accordance with the present invention.

FIG. 4 is an illustration of an exemplary assignment 400 of streams to two threads. In FIG. 4, threads 410 and 420 are assigned two streams each. Streams 112 and 114 are assigned to thread 410, and streams 116 and 118 are assigned to thread 420. Each stream is assigned a unique thread id. For example, stream 112 has thread ID 0, stream 114 has thread ID 1, stream 116 has thread ID 2, and stream 118 has thread ID 3. Each stream is also associated with a respective counter. For example, counter 132 is associated with stream 112, counter 134 is associated with stream 114, counter 136 is associated with stream 116, and counter 138 is associated with stream 118. The thread IDs can also be used to identify the counters associated with the streams. These examples are illustrative and not intended to limit the invention.

In step 330, shader processor 120 emits the data into the streams assigned to the corresponding threads. For example, data for thread 410 is emitted into streams 112 and 114, which have assigned thread IDs 0 and 1 respectively. Data for thread 420 is emitted into streams 116 (thread ID 2) and 118 (thread ID 3). The emitted data in each stream is tracked in its associated counter. For example, counter 132 tracks data for stream 112, counters 134 tracks data for stream 114, counter 136 tracks data for stream 116, and counter 138 tracks data for 118.

In one embodiment, the counters can show the amount of emitted data in the corresponding streams. In another example, emit controller 122 calculates the next available address for each stream and records it in the associated counter. Shader processor 120 can use such address information when emitting additional data. In one embodiment, shader processor 120 can emit data from ring buffer 110 into the streams. In an alternative embodiment, shader processor 120 can emit data directly into the streams after processing.

Note that, in some embodiments, not all the streams are used by shader processor 120 for data emission. Shader processor 120 can just enable a subset of the streams depending upon specific applications.

Once the data are emitted into the streams, shader processor 120 can begin to output the streams via stream buffers. In step 340, shader processor 120 assigns a respective stream buffer to each stream. For example, according to FIG. 1, stream buffer 142 is assigned to stream 112, stream buffer 144 is assigned to stream 114, stream buffer 146 is assigned to stream 116, and stream buffer 148 is assigned to stream 118. This example is illustrative and not intended to limit the invention.

In step 350, shader processor can output streams 112, 114, 116, and 118 to corresponding stream buffers 142, 144, 146, and 148. Emit controller 122 can use counters 152, 154, 156, and 158 to track the stored stream data in stream buffers 142, 144, 146, and 148 respectively. As mentioned above, counters 152, 154, 156, and 158 can be as the same type as counters 132, 134, 136, and 138. In one embodiment, each stream is stored in a respective stream buffer. In some further embodiments, two or more streams can be stored in one stream buffer.

In step 360, the data in stream buffers 142, 144, 146, and 148 are then sent to output 160.

Figure 5A:
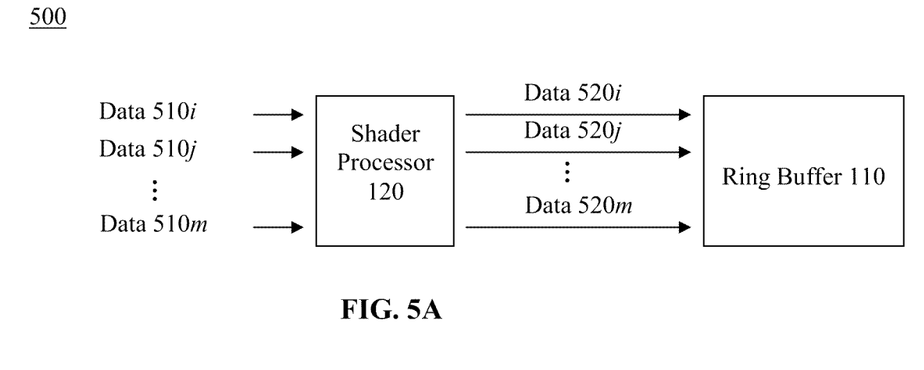
FIGS. 5A and 5B are exemplary diagrams illustrating possible data flows on a GPU in accordance with the present invention.
Figure 5B:
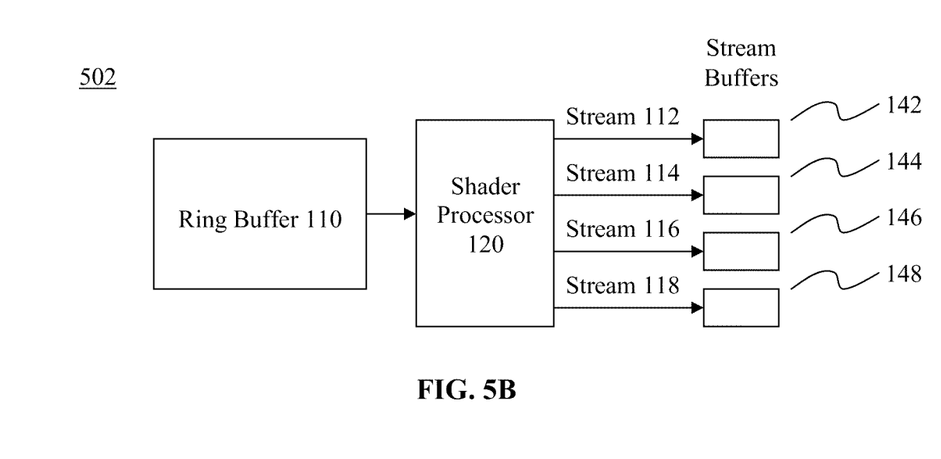

FIGS. 5A and 5B are illustrations of exemplary data flows 500 and 502 in GPU 100, according to one embodiment of the invention. In FIG. 5A, shader processor 120 receives data for m threads, such as data 510$i$, 510$j$, and 510$m$ (0<i,j<m). Data 510$i$, 510$j$, and 510$m$ can be processed by corresponding threads running in shader processor 120. Data 520$i$, 520$j$, and 520$m$ are processed data based on data 510$i$, 510$j$, and 510$m$ respectively. Shader processor 120 then output data 520$i$, 520$j$, and 520$m$ to ring buffer 110. Each thread is assigned a section in ring buffer 110. Data 520$i$, 520$j$, and 520$m$ can be output to the corresponding assigned sections in ring buffer 110 in parallel or based upon processing progress. Shader processor 120 can then select data from ring buffer 110 for output.

FIG. 5B shows an exemplary data flow for outputting data for ring buffer 110 to stream buffers via streams according to one embodiment of the invention. In FIG. 5B, shader processor selects one or more sets of data from ring buffer 110 and emits the selected data into four streams, stream 112, 114, 116, and 118. Note that, the number of streams for data emission is decided based on specific applications. In this example, four streams are data corresponding to one thread. Stream 112, 114, 116, and 118 are then stored in stream buffers 142, 144, 146, and 148. The data in the streams and stream buffers are tracked by the associated counters respectively.

In this way, the data in ring buffer 110 can be ordered and output sequentially. By allowing the threads to run in the shader processor in parallel and only serializing data output after they finish, the GPU can run faster and be more general purpose.

According to a feature of the present invention, shader processor 120 can perform data expansion or compaction automatically after the oldest thread finishes. So the data can be consumed by other system components. For data expansion, some of the data is replicated to facilitate its emission into the streams.

The data compaction is implemented by having counters that keep track of how much data has been emitted into each stream of a thread. For example, addresses for the data can be generated in the counters associated with streams. When shader processor emits the data into streams, these addresses allow shader processor 120 to skip empty space in ring buffer 110. These counters can be stored in on-chip registers of GPU 100 or in an off-chip memory. When the oldest thread (or group of threads) completes, emit controller 122 reads the associated counters and generate addresses for the corresponding data. These addresses are used by shader processor 120 for data emission.

With traditional rendering, there is a single stream of output data so there is one counter per thread. In order to support multiple streams, the counters are partitioned such that each thread is assigned the same number of counters as it is assigned streams. If the counters are stored in on-chip registers of GPU 100, executing additional streams can reduce the total number of threads that can be executed in parallel. If the counters are stored in a buffer in an off-chip memory, additional streams can require more memory, but don't reduce the number of threads that can execute in parallel. In other embodiments, the counters are stored on-chip to avoid the delay in waiting for the values to be fetched from the off-chip memory. The decision to implement on-chip vs. off-chip counters is based on particular applications.

According to one feature of the present invention, the workload of the GPU is easily parallelizable without requiring complicated programming. This keeps significant amounts of hardware busy and efficiently hides latency.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. For example, various aspects of the present invention can be implemented by software, firmware, hardware (or hardware represented by software such, as for example, Verilog or hardware description language instructions), or a combination thereof. Exemplary system 100 in which the present invention, or portions thereof, can be implemented as computer-readable code. After reading this description, it will become apparent to a person skilled in the relevant art how to implement the invention using other computer systems and/or computer architectures.

It should be noted that the simulation, synthesis and/or manufacture of the various embodiments of this invention can be accomplished, in part, through the use of computer readable code, including general programming languages (such as C or C++), hardware description languages (HDL) including Verilog HDL, VHDL, Altera HDL (AHDL) and so on, or other available programming and/or schematic capture tools (such as circuit capture tools). This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and intranets. It is understood that the functions accomplished and/or structure provided by the systems and techniques described above can be represented in a core (such as a GPU core) that is embodied in program code and can be transformed to hardware as part of the production of integrated circuits.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A processor, comprising:
an arithmetic logic unit (ALU) configured to:
generate a set of output data associated with a processed thread;
emit in parallel from the processed thread, the set of output data to corresponding streams of a plurality of parallel streams associated with the processed thread; and
a first number of counters, each counter associated with a respective stream of the plurality of parallel streams, configured to respectively track the set of output data independently.

2. The processor of claim 1, further configured to:
record, in a counter of the first number of counters, an amount of output data emitted into a respective stream of the plurality of parallel streams.

3. The processor of claim 1, further comprising:
an emit controller configured to:
associate each counter of the first number of counters with a respective stream of the plurality of parallel streams; and
record in an associated counter, an amount of output data emitted into respective stream of the plurality of streams.

4. The processor of claim 1, further comprising:
a plurality of stream buffers, each associated with a respective stream, configured to respectively store the respective streams of the plurality of streams.

5. The processor of claim 4, further comprising:
a second number of counters, each counter associated with a respective stream buffer, configured to respectively track the stored respective streams in the plurality of stream buffers.

6. The processor of claim 1, further comprising:
a ring buffer configured to store at least one set of output data.

7. The processor of claim 6, further configured to emit at least one set of output data to the ring buffer.

8. The processor of claim 6, further configured to read the at least one set of output data stored in the ring buffer.

9. The processor of claim 6, further configured to:
assign sections of the ring buffer to the processed thread;
emit the set of output data to the assigned section of the ring buffer; and
emit the set of output data from the ring buffer into the respective streams of the plurality of parallel streams.

10. The processor of claim 1, wherein the ALU is a shader processor.

11. The processor of claim 1, wherein the processor is a graphics processing unit (GPU).

12. The processor of claim 1, further comprising:
the arithmetic logic unit (ALU) configured to:
generate a second set of output data associated with a second processed thread in parallel with the set of output data;
emit in parallel from the second processed thread, the second set of output data to corresponding streams of a second plurality of parallel streams at an output frequency independent of the set of output data; and
track the second set of output data independently through respective streams of the second plurality of parallel streams.

13. A method comprising:
generating a set of output data corresponding to a processed thread;
a processor emitting in parallel from the processed thread, the set of output data to corresponding streams of a plurality of parallel streams associated with the processed thread; and
tracking the set of output data independently through a first number of counters, each counter associated with a respective stream of the plurality of parallel streams.

14. The method of claim 13, wherein the tracking further comprises:
recording, in an associated counter, an amount of output data emitted into the respective stream.

15. The method of claim 13, further comprising:
storing the respective streams of the plurality of parallel streams in a plurality of stream buffers; and
using a second number of counters, each counter associated with a respective stream buffer, to respectively track the stored respective streams of the plurality of parallel streams in the plurality of stream buffers.

16. The method of claim 15, wherein the respectively tracking comprises:
recording, in the second number of counters, an amount of output data corresponding to the respective streams of the plurality of parallel streams stored in the stream buffers.

17. The method of claim 13, further comprising:
emitting the set of output data into a section of a ring buffer, associated with the processed thread; and
emitting the set of output data from the ring buffer into the respective streams of the plurality of parallel streams.

18. The method of claim 13, wherein the processor is a graphics processing unit (GPU).

19. The method of claim 13, further comprising:
generating a second set of output data corresponding to a second processed thread in parallel with the set of output data;
emitting in parallel from the second processed thread, the second set of output data to corresponding streams of a second plurality of parallel streams at an output frequency independent of the set of output data; and
tracking the second set of output data independently through respective streams of the second plurality of parallel streams.

20. A non-transitory computer readable media storing instructions, execution of which, by a processing unit, cause the processing unit to perform operations comprising:
generating a set of output data corresponding to a processed thread;
emitting in parallel from the processed thread, the set of output data to corresponding streams of a plurality of parallel streams associated with the processed thread; and
tracking the set of output data independently through a first number of counters, each counter associated with a respective stream of the plurality of parallel streams.

21. The non-transitory computer readable media of claim 20 wherein the instructions comprise hardware description language instructions.

22. The non-transitory computer readable media of claim 20, wherein the processing unit is a graphics processing unit (GPU).

23. The non-transitory computer readable media of claim 20 wherein the operations further comprise:
generating a second set of output data corresponding to a second processed thread in parallel with the set of output data;
emitting in parallel from the second processed thread, the second set of output data to corresponding streams of a second plurality of parallel streams at an output frequency independent of the set of output data; and
tracking the second set of output data independently through respective streams of the second plurality of parallel streams.

\* \* \* \* \*